(12) United States Patent
Ugawa (10) Patent No.: US 7,169,512 B2
(45) Date of Patent: Jan. 30, 2007

(54) ELECTROLYTIC SOLUTION AND BATTERY USING IT

(75) Inventor: Shinsaku Ugawa, Fukushima (JP)

(73) Assignee: Sony Corporation, Tokyo (JP)

( * ) Notice: Subject to any disclaimer, the term of this patent is extended or adjusted under 35 U.S.C. 154(b) by 113 days.

(21) Appl. No.: 10/818,816

(22) Filed: Apr. 6, 2004

(65) Prior Publication Data

US 2004/0202941 A1   Oct. 14, 2004

(30) Foreign Application Priority Data

Apr. 9, 2003   (JP) ............................ P2003-104874

(51) Int. Cl.
*H01M 10/40* (2006.01)
(52) U.S. Cl. ...................... 429/332; 429/326
(58) Field of Classification Search ............ None
See application file for complete search history.

(56) References Cited

U.S. PATENT DOCUMENTS

| | | | |
|---|---|---|---|
| 4,957,833 A | * | 9/1990 | Daifuku et al. ............. 429/332 |
| 2003/0049541 A1 | * | 3/2003 | Inagaki et al. ............. 429/332 |
| 2005/0123834 A1 | * | 6/2005 | Noguchi et al. ............ 429/326 |

* cited by examiner

*Primary Examiner*—John S. Maples
(74) *Attorney, Agent, or Firm*—Sonnenschein Nath & Rosenthal LLP (57) ABSTRACT

The invention provides an electrolytic solution and a battery, which can sufficiently improve cycle characteristics. The battery comprises an electrode winding body, wherein a cathode and an anode are layered and wound sandwiching a separator inside a battery can. The electrolytic solution is impregnated in the separator. The electrolytic solution contains a high dielectric constant solvent comprised of at least either ethylene carbonate or propylene carbonate; dimethyl carbonate; and diphenyl carbonate at a mass ratio of 5 to 40:58 to 93: more than 0 to 5.

4 Claims, 6 Drawing Sheets

ELECTROLYTIC SOLUTION AND BATTERY USING IT

BACKGROUND OF THE INVENTION

1. Field of the Invention

The present invention relates to a battery comprising a cathode, an anode and an electrolytic solution, and an electrolytic solution used for it.

2. Description of the Related Art

In recent years, many portable electronic devices such as a mobile phone and a laptop computer have been introduced. Downsizing and weight saving of these devices have been made. Along with these situations, as a portable power source for these electronic devices, a lithium ion secondary battery has attracted attention. Improvement of characteristics of the lithium ion secondary battery has been desired.

Recently, it has been reported that characteristics of the lithium ion secondary battery have been improved by using an electrolyte wherein ethylene carbonate, diethyl carbonate and diphenyl carbonate are mixed (for example, refer to Japanese Patent No. 3080609).

However, in the battery, there has been a problem that sufficient cycle characteristics cannot be obtained.

SUMMARY OF THE INVENTION

The invention has been achieved in consideration of such a problem, and it is an object of the invention to provide an electrolytic solution and a battery which can sufficiently improve cycle characteristics.

A first electrolytic solution according to the invention contains a high dielectric constant solvent comprised of at least either ethylene carbonate or propylene carbonate; dimethyl carbonate; and diphenyl carbonate at a mass ratio of 5 to 40:58 to 93:more than 0 to 5.

A second electrolytic solution according to the invention contains a solvent containing a high dielectric constant solvent comprised of at least either ethylene carbonate or propylene carbonate of 5 wt % to 40 wt %; dimethyl carbonate of 58 wt % to 93 wt %; and diphenyl carbonate of 5 wt % or less.

A first battery according to the invention comprises a cathode; an anode; and an electrolytic solution, wherein the electrolytic solution contains a high dielectric constant solvent comprised of at least either ethylene carbonate or propylene carbonate; dimethyl carbonate; and diphenyl carbonate at a mass ratio of 5 to 40:58 to 93:more than 0 to 5.

A second battery according to the invention comprises a cathode; an anode; and an electrolytic solution, wherein the electrolytic solution contains a solvent containing a high dielectric constant solvent comprised of at least either ethylene carbonate or propylene carbonate of 5 wt % to 40 wt %; dimethyl carbonate of 58 wt % to 93 wt %; and diphenyl carbonate of 5 wt % or less.

In the electrolytic solution and the battery according to the invention, the high dielectric constant solvent, dimethyl carbonate, and diphenyl carbonate are contained at respective given rates. Therefore, chemical stability is improved and a sufficient battery capacity and cycle characteristics can be obtained.

Other and further objects, features and advantages of the invention will appear more fully from the following description.

DETAILED DESCRIPTION OF THE PREFERRED EMBODIMENT

An embodiment of the invention will be described in detail hereinbelow with reference to the drawings.

Figure 1:
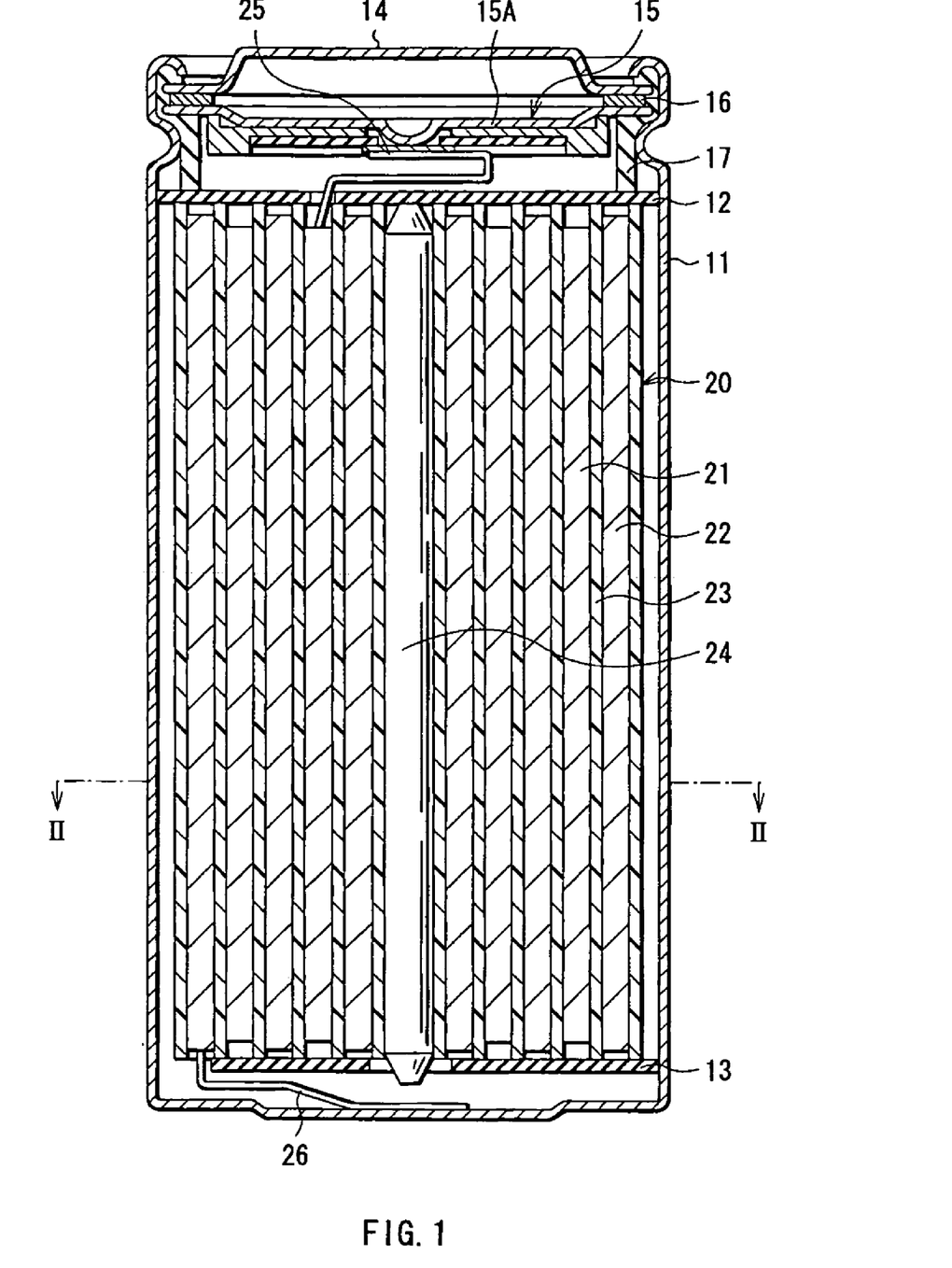
FIG. 1 is a cross sectional view which shows a construction of a secondary battery according to an embodiment of the invention.

FIG. 1 shows a cross sectional structure of a secondary battery according to the embodiment of the invention. This secondary battery is a so-called cylinder-type battery, and comprises an electrode winding body 20 inside a battery can 11 in the shape of an approximately hollow cylinder. The battery can 11 is made of, for example, iron (Fe) plated by nickel (Ni). One end of the battery can 11 is closed, and the other end thereof is opened. Inside the battery can 11, a pair of insulating plates 12 and 13 are respectively arranged so that the electrode winding body 20 is sandwiched between the insulating plates 12 and 13, and the insulating plates 12 and 13 are located perpendicular to the winding periphery face.

At the open end of the battery can 11, a battery cover 14 and a safety valve mechanism 15 and a PTC (Positive Temperature Coefficient) device 16 provided inside this battery cover 14 are mounted through caulking by a gasket 17. Inside of the battery can 11 is sealed. The battery cover 14 is, for example, made of a material similar to that of the battery can 11. The safety valve mechanism 15 is electrically connected to the battery cover 14 through the PTC device 16. When an inner pressure of the battery becomes a certain level or more by inner short circuit or exterior heating, a disk plate 15A flips to cut the electrical connection between the battery cover 14 and the electrode winding body 20. When a temperature rises, the PTC device 16 limits a current by increasing its resistance value to prevent abnormal heat generation by a large current. The gasket 17 is made of, for example, an insulating material and its surface is coated with asphalt.

Figure 2:
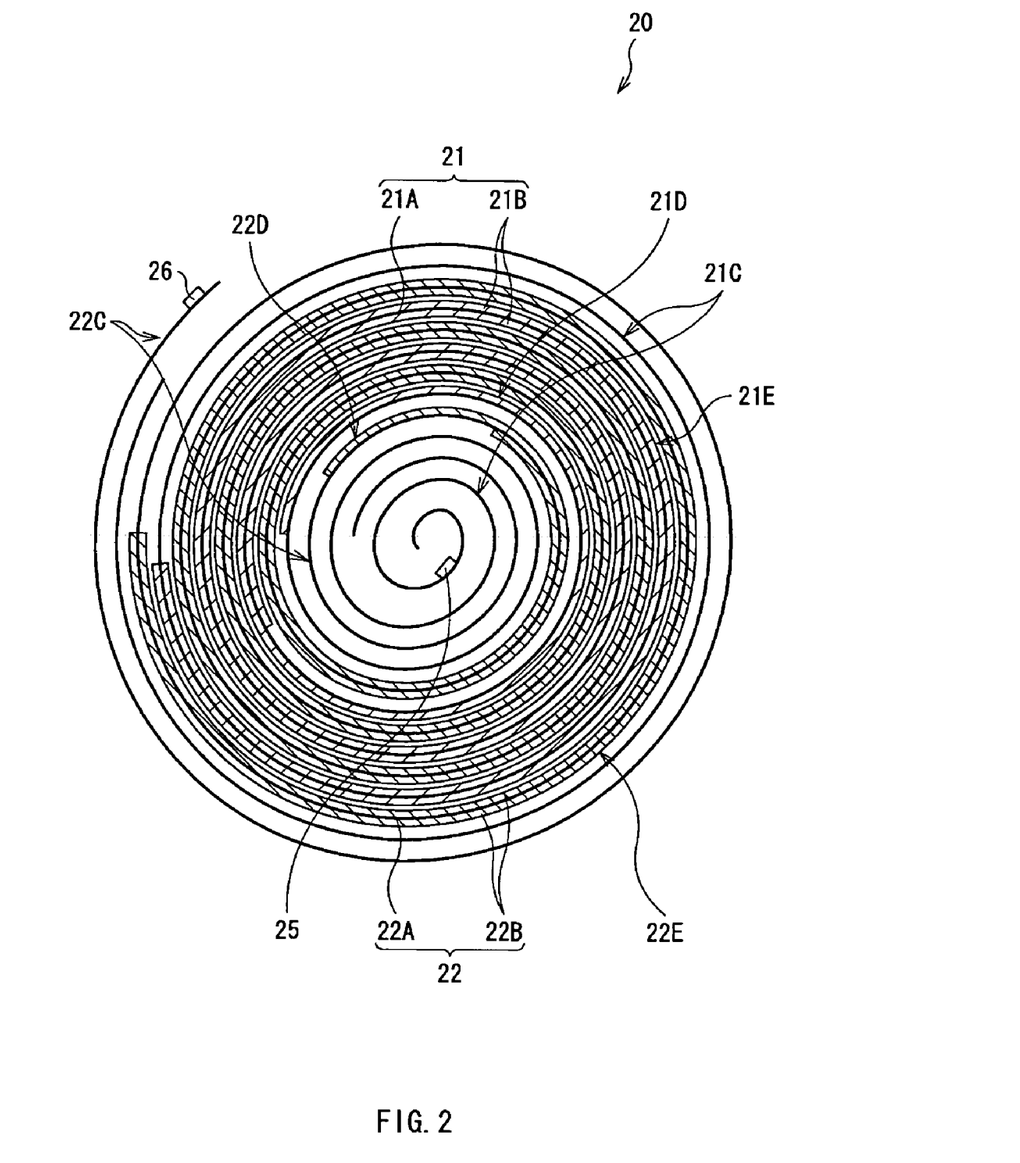
FIG. 2 is a cross sectional view which shows a construction taken along line II—II of an electrode winding body illustrated in FIG. 1.

FIG. 2 is a view showing a cross sectional construction taken along line II—II of the electrode winding body 20 illustrated in FIG. 1. The electrode winding body 20 is formed by layering and winding a strip-shaped cathode 21 and a strip-shaped anode 22 with a separator 23 in between. A center pin 24 is inserted in the center of the electrode winding body 20. In FIG. 2, the separator 23 is omitted. A cathode lead 25 made of aluminum (Al) or the like is connected to the cathode 21 of the electrode winding body 20. An anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

The cathode 21 comprises, for example, a current collector 21A having a pair of facing faces and active material layer 21B provided on both sides or on a single side of the current collector 21A. The current collector 21A is made of, for example, aluminum, nickel, or stainless.

The active material layer 21B contains, for example, one or more cathode materials capable of inserting and extracting lithium as a cathode active material. In addition, the active material layer 21B can also include a conductive agent such as carbon materials and a binder such as polyvinylidene fluoride as necessary. As a cathode material capable of inserting and extracting lithium, for example, lithium complex oxides containing lithium and transition metals are preferable. Since the lithium complex oxide can generate a high voltage and have a high density, a high capacity can be obtained. The lithium complex oxide which contains at least one from the group consisting of cobalt (Co), nickel, manganese (Mn), iron, vanadium (V), and titanium (Ti) as a transition metal is preferable. Concrete examples of the lithium complex oxide include $LiCoO_2$, $LiNiO_2$, $LiMn_2O_4$, $LiNi_{0.5}Co_{0.5}O_2$, and $LiNi_{0.5}Co_{0.3}Mn_{0.2}O_2$. In addition, phosphate compounds such as $LiFePO_4$ and $LiFe_{0.5}Mn_{0.5}PO_4$ can be also cited.

As the cathode 21 does, the anode 22 comprises, for example, a current collector 22A having a pair of facing faces and active material layer 22B provided on both sides or on a single side of the current collector 22A. The current collector 22A is made of, for example, copper (Cu), nickel, or stainless.

The active material layer 22B contains, for example, one or more anode materials capable of inserting and extracting lithium as an anode active material. In addition, the active material layer 22B can also include a binder similar to in the cathode 21 as necessary. Examples of the anode material capable of inserting and extracting lithium include carbon materials, metal oxides, and high molecular weight materials. Examples of the carbon materials include artificial graphite, natural graphite, graphitizable carbon, and non-graphitizable carbon. Examples of the metal oxides include iron oxide, ruthenium oxide, molybdenum oxide, and tungstic oxide. Examples of the high molecular weight materials include polyacetylene and polypyrrole.

In addition, examples of the anode material capable of inserting and extracting lithium include simple substances, alloys, and compounds of metal elements or metalloid elements which can form an alloy with lithium. Examples of the alloys include alloys consisting of two or more metal elements and, in addition, alloys consisting of one or more metal elements and one or more metalloid elements. Examples of structures of the materials include a solid solution structure, a eutectic (eutectic mixture) structure, an intermetallic compound structure, and a concomitant state comprised of two or more of the foregoing structures.

Examples of the metal elements or the metalloid elements which can form an alloy with lithium include magnesium (Mg), boron (B), arsenic (As), aluminum (Al), gallium (Ga), indium (In), silicon (Si), germanium (Ge), tin (Sn), lead (Pb), antimony (Sb), bismuth (Bi), cadmium (Cd), silver (Ag), zinc (Zn), hafnium (Hf), zirconium (Zr), yttrium (Y), palladium (Pd) and platinum (Pt). Examples of alloys or compounds thereof include ones which are expressed by a chemical formula of $Ma_sMb_t$. In this chemical formula, Ma represents at least one of metal elements and metalloid elements capable of forming an alloy with lithium. Mb represents at least one of elements other than Ma. Values of s and t satisfy s>0 and t≧0, respectively.

Specially, simple substances, alloys, or compounds of metal elements or metalloid elements in Group 14 in the long-period periodic table are preferable. Silicon and tin, or their alloys and compounds are particularly preferable. These materials can be crystalline or amorphous ones.

Concrete examples of such alloys and compounds include LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_{Si2}N_2O$, $SiO_v$ (0<v≦2), $SnO_w$ (0<w≦2), $SnSiO_3$, LiSiO, and LiSnO.

In this secondary battery, the cathode 21 also comprises an exposed area 21C wherein no active material layer 21B is provided, an external active material area 21D wherein the active material layer 21B is provided only on the external side of the current collector 21A, and a both sides active material area 21E wherein the active material layer 21B are provided on both sides of the current collector 21A. The anode 22 also comprises an exposed area 22C wherein no active material layer 22B is provided, an external active material area 22D wherein the active material layer 22 B is provided only on the external side of the current collector 22A, and a both sides active material area 22E wherein the active material layer. 22B are provided on both sides of the current collector 22A. Regarding the exposed area 21C of the cathode 21, two or more circuits are provided at the center side of the winding body, and one or more circuits are provided at the peripheral side of the winding body. Regarding the exposed area 22C of the anode 22, one circuit or more are provided at the center side of the winding body and at the peripheral side of the winding body, respectively. These exposed areas are intended to improve heat release characteristics, and to promote thermal diffusion by selectively generating short circuit at the center side of the winding body and the peripheral side of the winding body of the battery in order to improve safety when pressurized from outside the battery. In particular, when the anode 22 exists inside the cathode 21, there is a possibility that a welding trace of the cathode lead 25 penetrates the separator 23 to generate short circuit. Therefore, regarding the exposed area 21C at the center side of the winding body, one or more circuit is additionally provided compared to the exposed area 22C. Regarding the external active material area 21D, nearly one circuit is provided at the center side of the winding body. The external active material area 22D is provided at the center side of the winding body.

Figure 3:
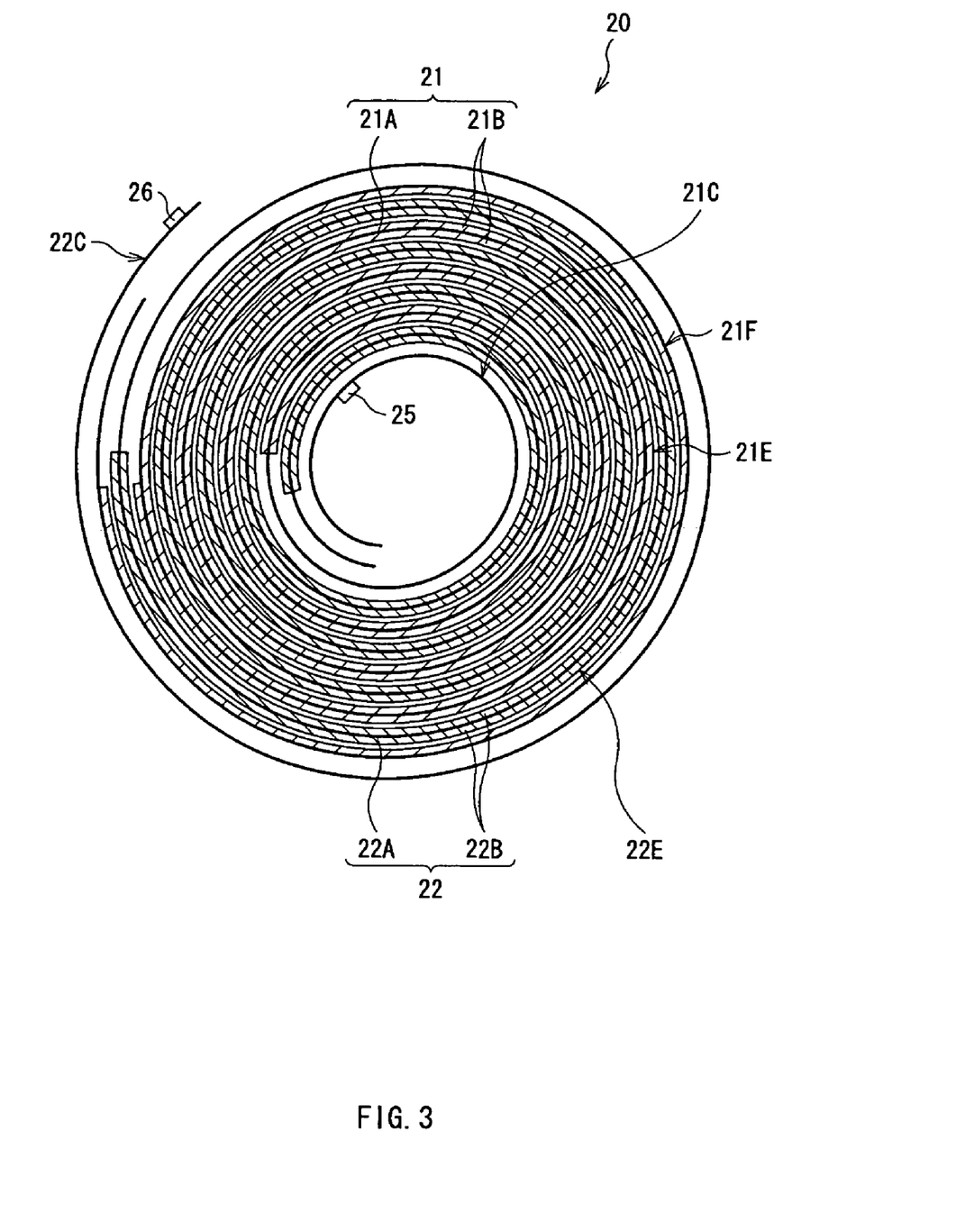
FIG. 3 is a cross sectional view which shows other construction taken along line II—II of the electrode winding body illustrated in FIG. 1.

As shown in FIG. 3, regarding the cathode 21, the exposed area 21C can be two circuits or less if one circuit or more of the exposed area 21C are provided at the center side of the winding body. Regarding the anode 22, it is not necessary one or more circuits of the exposed area 22C are provided at the center side of the winding body. Further, it is possible that the cathode 21 comprises an internal active material area 21F wherein the active material layer 21B is provided only at the internal side of the current collector 21A at the peripheral side of the winding body, and the internal active material area 21F is arranged to face the exposed area 22C of the anode 22C provided at the peripheral side of the winding body. In this case, it is also possible to sufficiently improve the heat release characteristics and secure safety. In FIG. 3, the separator 23 is omitted.

The separator 23 is constructed of, for example, a porous film made of a polyolefin material such as polypropylene and polyethylene, or a porous film made of an inorganic material such as a ceramics nonwoven cloth. The separator 23 can have a structure in which two or more of the foregoing porous films are layered.

An electrolytic solution, which is a liquid electrolyte, is impregnated in the separator 23. The electrolytic solution contains, for example, a solvent and a lithium salt of an electrolyte salt dissolved in the solvent. The solvent contains a high dielectric constant solvent comprised of at least either ethylene carbonate or propylene carbonate; dimethyl carbonate; and diphenyl carbonate shown in Chemical formula 1.

[Chemical formula 1]

Ethylene carbonate and propylene carbonate are electrochemically stable, and have high dielectric constants. In particular, it is preferable that both ethylene carbonate and propylene carbonate are contained, since their interaction enables improvement of battery characteristics. Further, dimethyl carbonate can improve a battery capacity and cycle characteristics by lowering a viscosity of the electrolytic solution. Further, diphenyl carbonate can improve cycle characteristics by forming a film on the surface of the anode 22.

Figure 4:
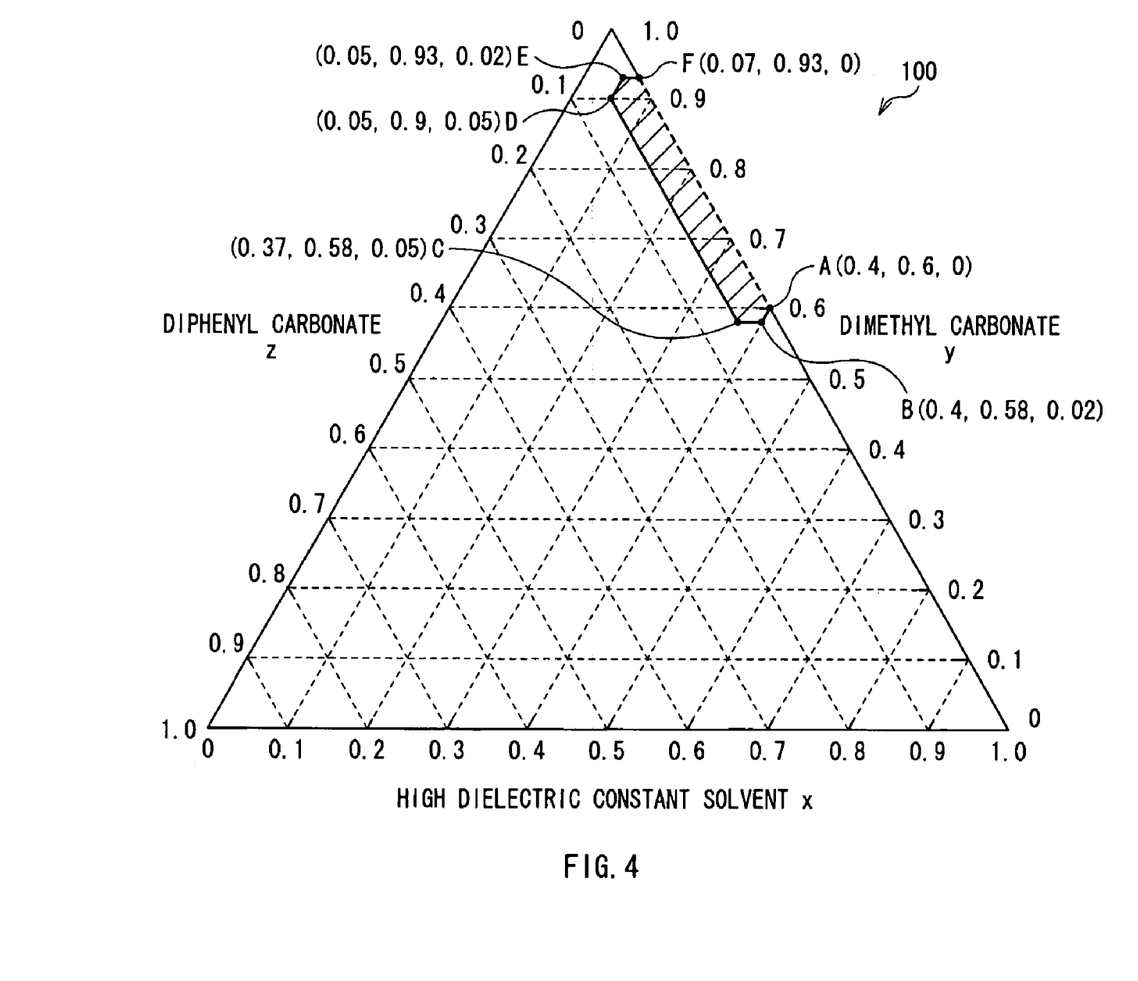
FIG. 4 is a triangular figure which shows rates of a high dielectric constant solvent, dimethyl carbonate and diphenyl carbonate of an electrolytic solution according to the embodiment of the invention.

A mass ratio of the high dielectric constant solvent, dimethyl carbonate, and diphenyl carbonate is preferably 5 to 40:58 to 93:more than 0 to 5. That is, as shown in FIG. 4, it is preferable that in a triangular FIG. 100 whose apexes correspond to respective max rates, respective rates by such a ratio are values within an area except for z=0 framed by a line formed by connecting dots A, B, C, D, E, and F shown in Mathematical formula 1, where the high dielectric constant solvent is x, dimethyl carbonate is y, and diphenyl carbonate is z. However, x+y+z=1, and the line formed by connecting the dots A, B, C, D, E, and F except for z=0 is included in the area. In FIG. 4, the area formed by connecting the dots A, B, C, D, E, and F is shown at the upper right by diagonal lines. z=0 part, which is not included in the area is shown by a dotted line.

[Mathematical formula 1]

A (x, y, z)=(0.4, 0.6, 0)
B (x, y, z)=(0.4, 0.58, 0.02)
C (x, y, z)=(0.37, 0.58, 0.05)
D (x, y, z)=(0.05, 0.9, 0.05)
E (x, y, z)=(0.05, 0.93, 0.02)
F (x, y, z)=(0.07, 0.93, 0)

Further, regarding these rates in the solvent, it is preferable that a rate of the high dielectric constant solvent is 5 wt % to 40 wt %; a rate of dimethyl carbonate is 58 wt % to 93 wt %; and a rate of diphenyl carbonate is more than 0 wt % to 5 wt % or less.

When rates of the dielectric constant solvent and dimethyl carbonate are not within the above ranges, a sufficient battery capacity cannot be obtained. A rate of diphenyl carbonate is more than the rates of the dielectric constant solvent and dimethyl carbonate, a film thickness is raised, a battery capacity is lowered, and sufficient cycle characteristics cannot be obtained. In particular, a rate of diphenyl carbonate is preferably more than 0.1, more preferably less than 2, and much more preferably 1 or less at a mass ratio in relation to the foregoing rates of the dielectric constant solvent and dimethyl carbonate. Further, a rate of diphenyl carbonate in the solvent is preferably more than 0.1 wt %, more preferably less than 2 wt %, and much more preferably 1 wt % or less. When the rate is within such a range, higher effects can be obtained.

The solvent can contain one or more materials in addition to the dielectric constant solvent, dimethyl carbonate and diphenyl carbonate. As other materials, nonaqueous solvents such as diethyl carbonate, ethyl methyl carbonate, vinylethylene carbonate, vinylene carbonate, 1,2-dimethoxy ethane, 1,2-diethoxy ethane, γ-butyrolactone, tetrahydrofuran, 2-methyltetrahydrofuran, 1,3-dioxolane, 4-methyl-1,3-dioxolane, diethyl ether, sulfolane, methyl sulfolane, acetonitrile, propionitrile, anisole, ester acetate, ester butyrate, and ester propionate can be cited.

Examples of the lithium salt include $LiClO_4$, $LiAsF_6$, $LiPF_6$, $LiBF_4$, $LiB(C_6H_5)_4$, $LiCH_3SO_3$, $LiCF_3SO_3$, LiCl, and LiBr. One of the above or a mixture of two or more of the above can be used as a lithium salt.

This secondary battery can be manufactured as follows, for example.

First, for example, a cathode active material capable of inserting and extracting lithium, a conductive agent, and a binder are mixed to prepare a cathode mixture. This cathode mixture is dispersed in a solvent such as N-methyl-2-pyrrolidone to obtain a cathode mixture slurry. Next, this cathode mixture slurry is applied to the current collector 21A, dried, and compression-molded to form the active material layer 21B. In result, the cathode 21 is fabricated.

Further, an anode material capable of inserting and extracting lithium and a binder are mixed to prepare an anode mixture. This anode mixture is dispersed in a solvent such as N-methyl-2-pyrrolidone to obtain an anode mixture slurry. Next, this anode mixture slurry is applied to the current collector 22A, dried, and compression-molded to form the active material layer 22B. In result, the anode 22 is fabricated.

Subsequently, the cathode lead 25 is attached on the current collector 21A by welding or the like and the anode lead 26 is attached on the current collector 22A by welding or the like. After that, the cathode 21 and the anode 22 are layered and wound with the separator 23 in between. An end of the cathode lead 25 is welded to the safety valve mechanism 15, and an end of the anode lead 26 is welded to the battery can 11. The wound cathode 21 and anode 22 are sandwiched between the pair of insulating plates 12 and 13, and the cathode 21 and the anode 22 are thereby housed inside the battery can 11. After housing the cathode 21 and the anode 22 inside the battery can 11, the electrolytic solution is injected inside the battery can 11, and impregnated in the separator 23. After that, at the open end of the battery can 11, the battery cover 14, the safety valve mechanism 15, and the PTC device 16 are fixed by caulking through the gasket 17. The secondary battery shown in FIG. 1 is thereby completed.

In this secondary battery, when charged, lithium ions are extracted from the cathode 21, and are inserted in the anode 22 through the electrolytic solution. When discharged, for example, lithium ions are extracted from the anode 22, and are inserted in the cathode 21 through the electrolytic solution. In this case, the electrolytic solution contains the high dielectric constant solvent comprised of at least either ethylene carbonate or propylene carbonate; dimethyl carbonate; and diphenyl carbonate at given rates. Therefore, chemical stability is improved. Consequently, a sufficient battery capacity and cycle characteristics can be obtained.

As above, according to this embodiment, the electrolytic solution contains the high dielectric constant solvent comprised of at least either ethylene carbonate or propylene carbonate; dimethyl carbonate; and diphenyl carbonate at given rates. Therefore, both a battery capacity and cycle characteristics can be sufficiently improved.

[EXAMPLE]

Further, descriptions will be given in detail of concrete examples of the invention.

Examples 1 to 10

Figure 5:
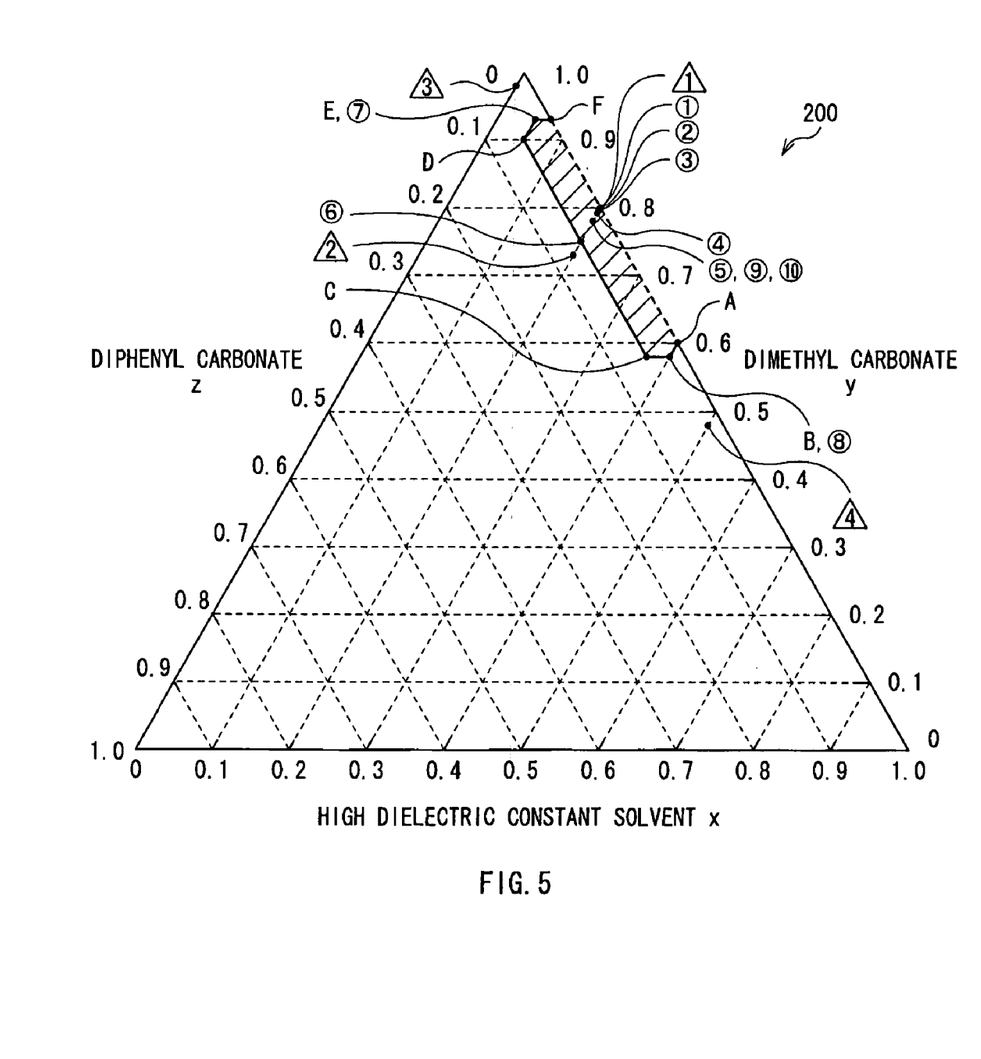
FIG. 5 is a triangular figure which shows rates of a high dielectric constant solvent, dimethyl carbonate and diphenyl carbonate of an electrolytic solution according to Examples of the invention.
Figure 6:
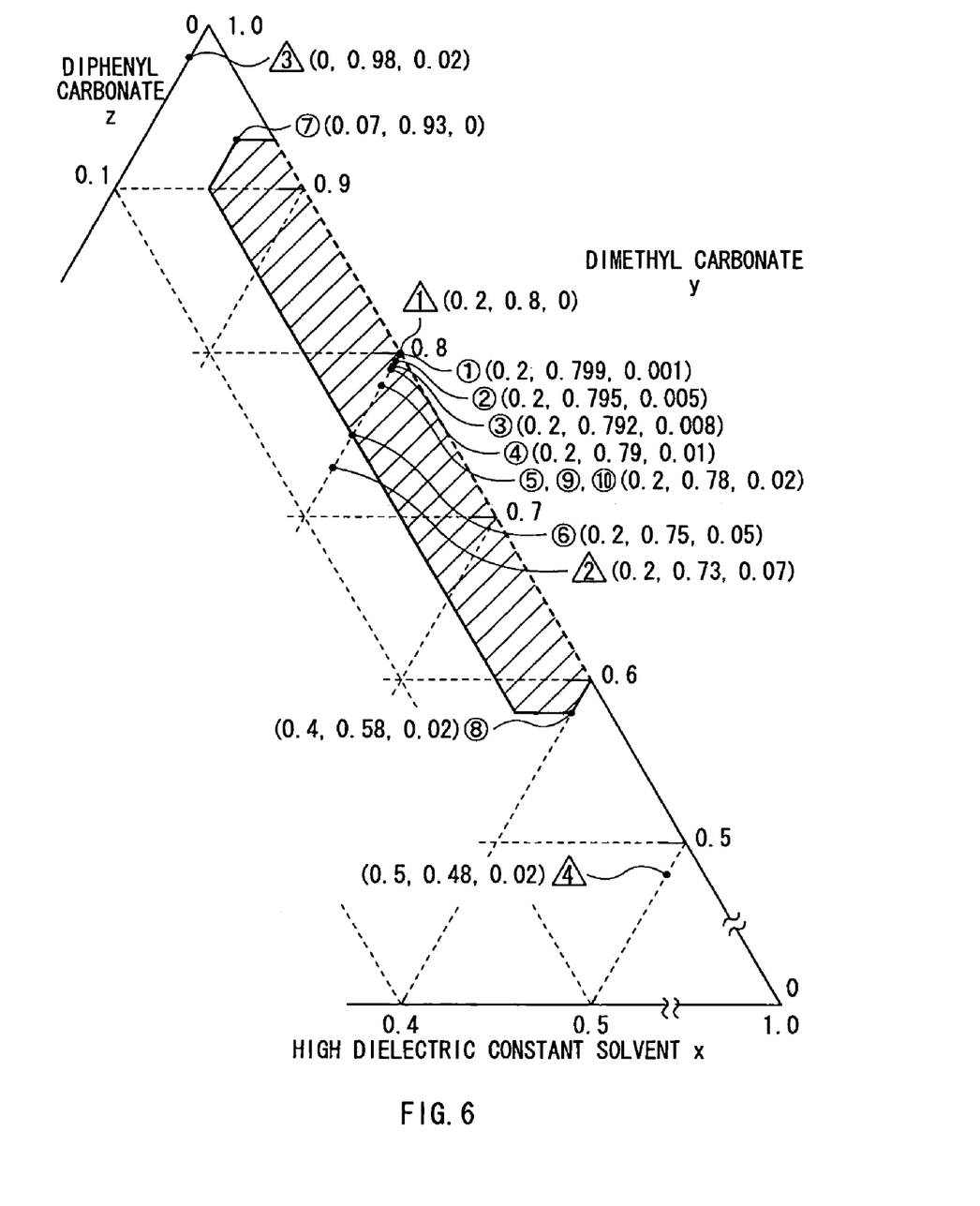
FIG. 6 is an enlarged view of part of the triangular figure shown in FIG. 5.

Secondary batteries explained in the embodiment were fabricated. In this case, a structure of the electrode winding body 20 was one shown in FIG. 3. An electrolytic solution wherein an electrolyte salt of $LiPF_6$ was dissolved at a concentration of 1 $mol/dm^3$ in a mixed solvent of a high dielectric constant solvent comprised of at least either ethylene carbonate or propylene carbonate; dimethyl carbonate; and diphenyl carbonate was used. Rates of ethylene carbonate, propylene carbonate, dimethyl carbonate, and diphenyl carbonate in the solvent were changed in Examples 1–10 as shown in Table 1 and FIGS. 5 and 6. FIG. 6 is an enlarged view of part of FIG. 5. Triangular FIG. 200 in FIGS. 5 and 6 is based on a mass ratio. Circled numbers are Example numbers.

ducting charge for 2 hours at a constant current of 1 C by setting a battery voltage to 4.2 V at 23° C., and then conducting discharge at a constant current of 1 C until a battery voltage reached 2.5 V. The initial capacity is a discharge capacity obtained in an initial charge and discharge. As a capacity retention ratio, a ratio of a discharge capacity at 200th cycle in relation to the initial capacity was found. 1 C means a current value with which the initial capacity is discharged in 1 hour. Obtained results are shown in Table 1. In Table 1, initial capacity values of Examples 1 to 10 and Comparative examples 2 to 5 are relative values when the initial capacity of Comparative example 1 is 100.

As evidenced by Table 1, according to Examples 1 to 10, sufficient initial capacities and capacity retention ratios could be obtained. Meanwhile, in Comparative example 1, the capacity retention ratio was low. It is thought that the reason thereof is that diphenyl carbonate was not added in Comparative example 1. In Comparative example 2, both the initial capacity and the capacity retention ratio were low. It is thought that the reason thereof is as follows. That is, in Comparative example 2, since the rate of diphenyl carbonate was high, a thick film was formed on the anode 22. In Comparative examples 3 and 4, both their initial capacities and their capacity retention ratio were also low. The reason thereof is thought as follows. That is, the rate of dimethyl carbonate having a low dielectric constant was high in Comparative example 3, and the rate of ethylene carbonate

TABLE 1

|  | Ethylene carbonate (wt %) | Propylene carbonate (wt %) | Dimethyl carbonate (wt %) | Diethyl carbonate (wt %) | Diphenyl carbonate (wt %) | Initial capacity (%) | Capacity retention ratio (%) |
|---|---|---|---|---|---|---|---|
| Example 1 | 20 | 0 | 79.9 | 0 | 0.1 | 100 | 92 |
| Example 2 | 20 | 0 | 79.5 | 0 | 0.5 | 101 | 96 |
| Example 3 | 20 | 0 | 79.2 | 0 | 0.8 | 101 | 97 |
| Example 4 | 20 | 0 | 79 | 0 | 1 | 101 | 97 |
| Example 5 | 20 | 0 | 78 | 0 | 2 | 101 | 94 |
| Example 6 | 20 | 0 | 75 | 0 | 5 | 100 | 94 |
| Example 7 | 5 | 0 | 93 | 0 | 2 | 101 | 93 |
| Example 8 | 40 | 0 | 58 | 0 | 2 | 100 | 92 |
| Example 9 | 0 | 20 | 78 | 0 | 2 | 101 | 94 |
| Example 10 | 10 | 10 | 78 | 0 | 2 | 101 | 93 |
| Comparative example 1 | 20 | 0 | 80 | 0 | 0 | 100 | 70 |
| Comparative example 2 | 20 | 0 | 73 | 0 | 7 | 80 | 85 |
| Comparative example 3 | 0 | 0 | 98 | 0 | 2 | 80 | 82 |
| Comparative example 4 | 50 | 0 | 48 | 0 | 2 | 87 | 82 |
| Comparative example 5 | 20 | 0 | 0 | 78 | 2 | 100 | 88 |

As Comparative examples 1 to 4 in relation to Examples 1 to 10, secondary batteries were fabricated in a manner similar to in Examples 1 to 10 except that rates of ethylene carbonate, propylene carbonate, dimethyl carbonate, and diphenyl carbonate in the solvent were changed as shown in Table 1 and FIGS. 5 and 6. In FIGS. 5 and 6, numbers in triangles are Comparative example numbers. As Comparative example 5 in relation to Examples 1 to 10, a secondary battery was fabricated in a manner similar to in Example 5, except that diethyl carbonate was used instead of dimethyl carbonate.

Regarding the fabricated secondary batteries of Examples 1 to 10 and Comparative examples 1 to 5, initial capacities and capacity retention ratio were examined by firstly conhaving a high viscosity was high in Comparative example 4. Therefore, in Comparative examples 3 and 4, transfer of lithium ions between the cathode 21 and the anode 22 was difficult. In addition, in Comparative example 5, the capacity retention ratio was also low. The reason thereof is thought as follows. That is, the dielectric constant of diethyl carbonate was lower than that of dimethyl carbonate. Therefore, lithium ions were hard to transfer. In result, along with repeat of charge and discharge, receiving characteristics of lithium ions of the anode 22 deteriorated.

That is, it was found that when the electrolytic solution contained a high dielectric constant solvent comprised of at least either ethylene carbonate or propylene carbonate; dimethyl carbonate; and diphenyl carbonate at a mass ratio of 5 to 40:58 to 93:more than 0 to 5, or the electrolytic solution contained a solvent containing a high dielectric constant solvent of 5 wt % to 40 wt %; dimethyl carbonate of 58 wt % to 93 wt %; and diphenyl carbonate of more than 0 wt % to 5 wt % or less, a battery capacity and cycle characteristics could be sufficiently improved.

As evidenced by Examples 1 to 6, there was a tendency that when a rate of diphenyl carbonate was raised, a capacity retention ratio firstly became high, reached the max value, and then became low. In particular, in Examples 2 to 4, capacity retention ratio of 95% or more could be obtained. That is, it was found that a rate of diphenyl carbonate was preferably more than 0.1 to less than 2, and was more preferably 1 or less at a mass ratio in relation to rates of the high dielectric constant solvent and dimethyl carbonate. Further, it was found that a rate of diphenyl carbonate in the solvent was preferably more than 0.1 wt % to less than 2 wt %, and was more preferably 1 wt % or less.

While the invention has been described with reference to the embodiment and Examples, the invention is not limited to the foregoing embodiment and Examples, and various modifications may be made. For example, though in the foregoing embodiment and Examples, case using the electrolytic solution, the liquid electrolyte has been described. However, other electrolyte containing the electrolytic solution can be used. Examples of other electrolyte include a gelatinous electrolyte wherein an electrolytic solution is held in a high molecular weight compound, a mixture of a solid electrolyte having ion conductivity and an electrolytic solution, and a mixture of a solid electrolyte and a gelatinous electrolyte.

As a gelatinous electrolyte, various high molecular weight compounds that absorb and gel the electrolytic solution can be used. Examples of such high molecular weight compounds include fluoro high molecular weight compounds such as polyvinylidene fluoride and a copolymer of vinylidene fluoride and hexafluoro propylene, ether high molecular weight compounds such as polyethylene oxide and a cross-linked complex including polyethylene oxide, and polyacrylonitrile. In particular, in the view of redox stability, the fluoro high molecular weight compounds are desirable.

As a solid electrolyte, for example, a high molecular weight solid electrolyte wherein an electrolyte salt is dispersed in a high molecular weight compound having an ion conductivity, or an inorganic solid electrolyte comprised of an ion conductive glass or an ionic crystal can be used. In this regard, as a high molecular weight compound, for example, an ether high molecular weight compound such as polyethylene oxide and a cross-linked complex including polyethylene oxide, an ester high molecular weight compound such as polymethacrylate, and an acrylate high molecular weight compound can be used by itself, by mixing them, or by copolymerizing them. As an inorganic solid electrolyte, lithium nitride, lithium iodide or the like can be used.

In the foregoing embodiment and Examples, the structures of the electrode winding body 20 have been explained by using concrete examples. However, the invention can be applied to cases using other winding structures. Further, the invention can be applied to a secondary battery having a winding structure in the shape of an oval or a polygon, and a secondary battery having a structure wherein a cathode and an anode are folded or layered as well. In addition, the invention can be applied to a secondary battery in the shape of a coin, a button, or a card. Furthermore, the invention can be also applied to primary batteries.

As described above, according to the electrolytic solution and the battery of the invention, the high dielectric constant solvent comprised of at least either ethylene carbonate or propylene carbonate; dimethyl carbonate; and diphenyl carbonate are contained at given rates. Therefore, a battery capacity and cycle characteristics can be sufficiently improved.

Obviously many modifications and variations of the present invention are possible in the light of the above teachings. It is therefore to be understood that within the scope of the appended claims the invention may be practiced otherwise than as specifically described.

What is claimed is:

1. An electrolytic solution, comprising:
   (a) a first high dielectric constant solvent, said first high dielectric constant solvent comprising a second solvent, wherein said second solvent is selected from ethylene carbonate, propylene carbonate or a mixture thereof;
   (b) dimethyl carbonate; and
   (c) diphenyl carbonate; wherein
      (i) a ratio A:T, A being the weight of said first high dielectric constant solvent and T being the weight of said electrolytic solution, is at least 0.05 and at most 0.4;
      (ii) a ratio B:T, B being the weight of said dimethyl carbonate and T being the weight of said electrolytic solution is at least 0.58 and at most 0.93; and
      (iii) a ratio C:T, C being the weight of said diphenyl carbonate, is at least 0.01 and at most 0.05.

2. An electrolytic solution comprising:
   (a) a first solvent selected from ethylene carbonate, propylene carbonate or a mixture thereof;
   (b) dimethyl carbonate; and
   (c) diphenyl carbonate; wherein
      (i) a ratio A:T, A being the weight of said first solvent and T being the weight of said electrolytic solution, is at least 0.05 and at most 0.4;
      (ii) a ratio B:T, B being the weight of said dimethyl carbonate and T being the weight of said electrolytic solution, is at least 0.58 and at most 0.93; and
      (iii) a ratio C:T, C being the weight of said diphenyl carbonate, is at least 0.01 and at most 0.05.

3. A battery, comprising:
   a cathode;
   an anode; and
   an electrolytic solution,
   wherein said electrolytic solution comprises:
   (a) a first high dielectric constant solvent, said first high dielectric constant solvent comprising a second solvent, wherein said second solvent is selected from ethylene carbonate, propylene carbonate or a mixture thereof;
   (b) dimethyl carbonate; and
   (c) diphenylcarbonate; wherein
      (i) a ratio A:T, A being the weight of said first high dielectric constant solvent and T being the weight of said electrolytic solution, is at least 0.05 and at most 0.4;
      (ii) a ratio B:T, B being the weight of said dimethyl carbonate and T being the weight of said electrolytic solution, is at least 0.58 and at most 0.93; and
      (iii) a ratio C:T, C being the weight of said diphenyl carbonate, is at least 0.01 and at most 0.05.

4. A battery, comprising:
   a cathode;
   an anode; and
   an electrolytic solution, said electrolytic solution comprising:

(a) a first solvent selected from ethylene carbonate, propylene carbonate or a mixture thereof;
(b) dimethyl carbonate; and
(c) diphenyl carbonate; wherein
   (i) a ratio A:T, A being the weight of said first solvent and T being the weight of said electrolytic solution, is at least 0.05 and at most 0.4;
   (ii) a ratio B:T, B being the weight of said dimethyl carbonate and T being the weight of said electrolytic solution, is at least 0.58 and at most 0.93; and
   (iii) ratio C:T, C being the weight of said diphenyl carbonate, is at least 0.01 and at most 0.05.

\* \* \* \* \*